Sept. 1, 1970  J. G. McILVAIN, JR., ET AL  3,526,566
METHOD AND APPARATUS FOR SCORING PAPERBOARD
AND PRODUCT PRODUCED THEREBY
Filed Aug. 20, 1968  3 Sheets-Sheet 1
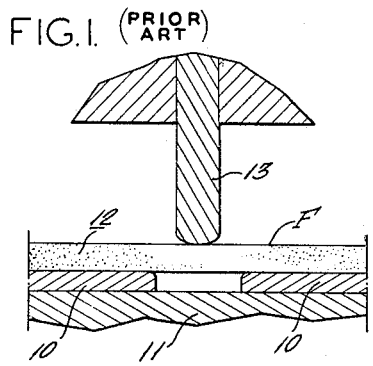
FIG. 1. (PRIOR ART)
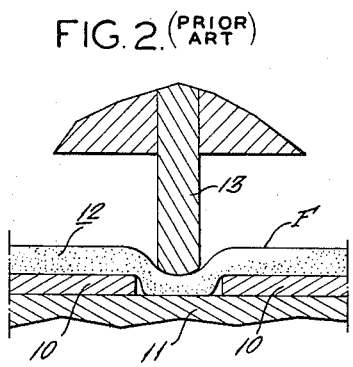
FIG. 2. (PRIOR ART)
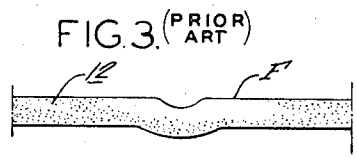
FIG. 3. (PRIOR ART)
FIG. 4.
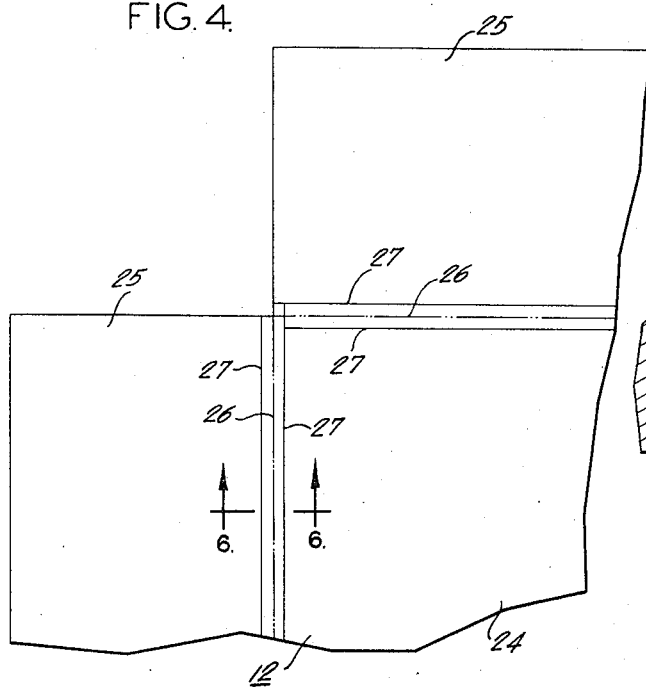
FIG. 5.
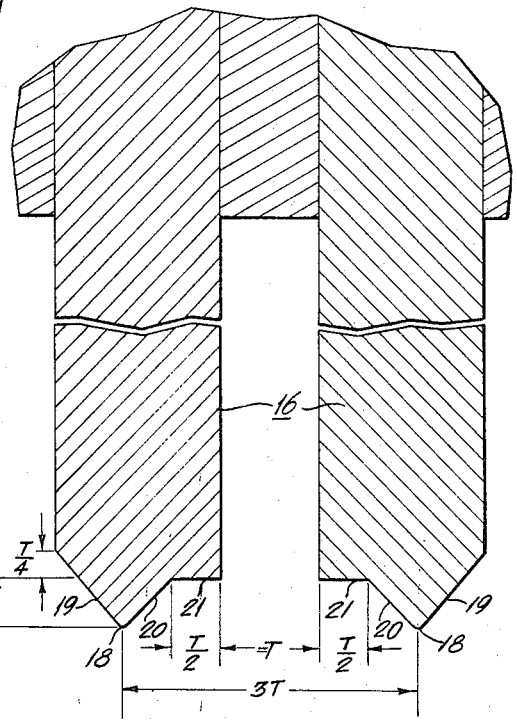
FIG. 6.
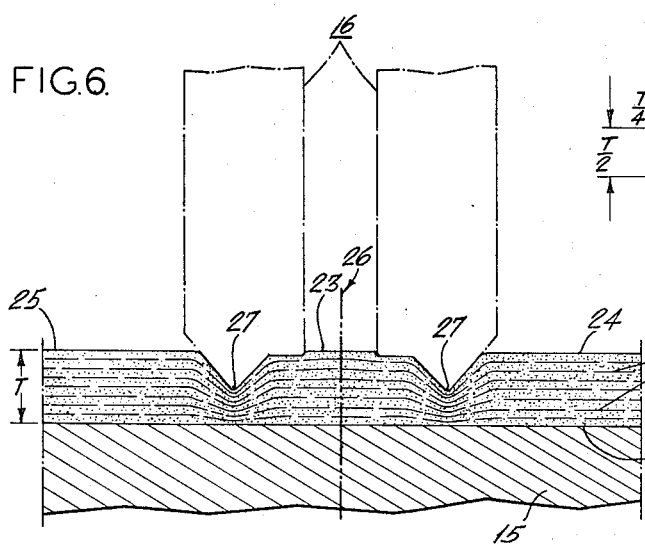
FIBER GRAIN LINES
INVENTORS:
JOHN GIBSON McILVAIN, JR.
THOMAS G. MARTIN
BY Howson & Howson
ATTYS.

INVENTORS:
JOHN GIBSON McILVAIN, JR.
THOMAS G. MARTIN
BY
Howson & Howson
ATTYS

United States Patent Office

3,526,566
Patented Sept. 1, 1970

3,526,566
METHOD AND APPARATUS FOR SCORING PAPERBOARD AND PRODUCT PRODUCED THEREBY
John Gibson McIlvain, Jr., West Chester, and Thomas G. Martin, Brandamore, Pa., assignors to Downingtown Paper Company, Downingtown, Pa., a corporation of Pennsylvania
Continuation-in-part of abandoned application Ser. No. 436,154, Mar. 1, 1965. This application Aug. 20, 1968, Ser. No. 757,210
Int. Cl. B32b 3/00; B31b 1/14
U.S. Cl. 161—123                               11 Claims

ABSTRACT OF THE DISCLOSURE

A scored paperboard product and method and apparatus for forming the paperboard product in which a fold line is formed by scoring the rear face of the paperboard, without distortion of the front face, along closely spaced parallel lines equally spaced from opposite sides of the center line of the desired fold line. The parallel score lines are created in the paperboard by a pair of parallel cutting or creasing rules each of which terminates in a board-engaging edge with the board-engaging edges of the rules spaced apart a distance of approximately one to two times the thickness of the paperboard for the formation of a 90° fold and approximately two to four times the thickness of the paperboard for the formation of 180° fold.

---

This application is a continuation-in-part of our co-pending application Ser. No. 436,154, filed Mar. 1, 1965, and now abandoned.

The present invention relates to new and useful improvements in methods and apparatus for scoring paperboard and new and useful improvements in a scored paperboard product.

At the present time paperboard is prepared for folding along a line by either a cut score which is cut along the line of fold to a depth which is a substantial portion but less than 100% of the thickness of the board, or by a perforated line which is alternately cutting the board to a depth of 100% of its thickness for a short distance and not cutting at all for a short distance or by creasing the board along the fold line. At the present time, creasing is accomplished by a pair of mating dies with the creasing rule engaging the face of the board and the back of the board being displaced into a die opening. It is difficult and time consuming to prepare properly mating dies. This is particularly true in the case of etched dies where the male and female dies have to mate perfectly. It would be highly desirable to have a single die form both the cutting and the total creasing operation both from the point of view of cost of preparation and to insure accuracy of fold by eliminating a hand operation or by eliminating a separate machine operation. It has also been extremely difficult to prepare rotary or wraparound dies because of the accuracy required to cause dies of this type to mate properly. In making rotary or wraparound dies, the complication of having the crease determined by two separate members of the die makes it impossible to adjust the pressure between the die and the paper or the cutting plate by shimming because when shimming the relative size of one member must be changed and in so doing the register relationship between the creasing rule and the mating die opening is lost.

Furthermore, with the present method of making fold lines on paperboard the manufacturer is limited in the type of paperboard which may be used. Most of the cheaper paperboard is not suitable for conventional paperboard cartons because of the inability to form proper fold lines on this board by presently existing methods and apparatus. If attempts are made to use this paperboard and form fold lines in the conventional manner, the face of the paperboard will split or crack at the fold line during the folding operation, making an unsightly finished product.

With the foregoing in mind the primary object of the present invention is to provide novel methods and apparatus for forming fold lines on paperboard.

A further object of the present invention is to provide novel methods and apparatus for forming fold lines in paperboard which eliminates the need for mating die members and permits proper fold lines to be made by working solely on one side of the board with the opposite side of the board resting against a flat surface. This will greatly simplify the production of etched dies and rotary or wraparound dies in that there will be no need to manufacture a pair of mating dies. Also, this eliminates a very time consuming procedure in making ready conventional equipment where the mating die for the creases is hand made by cutting slots to form the die opening in a piece of hard paper which is cemented to a plate for this purpose.

A still further object of the present invention is to provide novel methods and apparatus for forming fold lines on paperboard which paperboard has heretofore been unsuitable for use in the manufacture of folded cartons and the like.

A still further object of the present invention is to provide a novel paperboard product having a novel fold line formed thereon which differs substantially from the conventional fold line and which will permit the manufacture of novel cartons having, for example, reverse folds which have heretofore not always been practical.

Still a further object of the present invention is to provide novel methods and apparatus for forming fold lines on paperboard which will permit the formation of such fold lines in a much easier and more economical manner.

These and other objects of the present invention and the various features and details of the invention are hereinafter more fully set forth with reference to the accompanying drawings in which:

FIG. 1 is a fragmentary sectional view through a conventional set of dies illustrating the prior art method for forming fold lines;

FIG. 2 is a fragmentray sectional view similar to FIG. 1 with the die members in engagement with the paperboard;

FIG. 3 is a fragmentary view illustrating the form of the paperboard after creasing by the dies of FIG. 1;

FIG. 4 is a fragmentary plan view of a piece of paperboard creased by the dies of the present invention;

FIG. 5 is an enlarged fragmentary sectional view illustrating the die formed in accordance with the present invention;

FIG. 6 is an enlarged fragmentary sectional view taken on line 6—6, FIG. 4, illustrating the form of the fold line made in accordance with the present invention with the dies used to form the fold line shown in broken lines;

Figure 7:
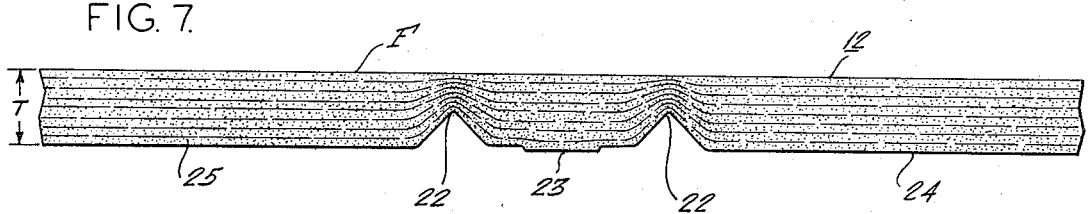
FIG. 7 is a fragmentary sectional view of a section of paperboard showing the fold line prior to folding of the paperboard.

According to the present invention, the paperboard fold lines are formed by cutting or creasing the rear face of the board at carefully predetermined locations at the fold line. The rear face of the paperboard is cut or creased along two closely spaced parallel score lines equally spaced from opposite sides of the center of the location of the desired fold. The parallel score lines may be parallel cut scores or parallel detents or parallel perforations or any combination of detents, perforations or cut scores. This weakens the rear face of the paperboard by either cutting or weakening the fibers of the rear face along these two parallel lines adjacent the desired fold line and disturbs and weakens the fiber bond between adjacent layers of fibers lying generally parallel to the rear face of the board in this area with the result that when the paperboard is folded along the fold line, the rear face of the paperboard will fail in compression, thereby forming the desired crease bundle. The disturbing and weakening of the bond between adjacent layers of fibers of the paperboard in this area causes the paperboard in the area between and adjacent the score lines and extending from the rear face of the paperboard toward the front face for approximately one-half the thickness of the paperboard to stratify along lines substantially parallel to the rear face of the paperboard.

FIGS. 1 to 3 illustrate the process for forming fold lines in paperboard prior to the present invention. As shown in FIG. 1, female die members 10 are mounted on a backing plate 11. The paperboard 12 is placed over the female die member 10 with its front face F upward away from the die member 10. The front face F of the paperboard is engaged by a creasing rule or male die member 13. As shown in FIG. 2, the male die member 13 is adapted to engage the front face of the paperboard along the length of the fold line and distort the paperboard as shown during formation of the fold line. By this prior art method as illustrated in FIGS. 1 and 2, the fibers in the paperboard at the front face F are severely bent and weakened as illustrated in FIG. 3 and when the paperboard is folded, for example, to form a carton, the back face of the paperboard may fail to mold properly into the desired form of a crease bundle.

FIGS. 5 and 6 illustrate one method and one form of apparatus of the present invention for forming fold lines in paperboard. With the apparatus of FIG. 5, the paperboard 12 is positioned with its front face F downwardly in contact with a smooth flat face of a backing plate 15 as shown in FIG. 6. By flat face of a backing plate as used here is meant the face of either a planar backing plate or the face of a cylindrical roll. The fold lines are formed by engaging the back of the paperboard with a creasing rule 16 which cuts or distorts the rear face of the board along spaced parallel score lines which are equally spaced from opposite sides of the center of location of the desired fold. The creasing rule 16 as illustrated in FIG. 5 comprises a pair of spaced elongated bars each having a board-engaging edge 18 along its length. The board engaging edges 18, 18 may either be sharpened to cut the rear face of the board or may be slightly rounded to crease or distort the rear face of the board. If desired, the board engaging edges may be interrupted along their lengths to cut the board along lines parallel to and equally spaced from the desired fold lines.

Preferably, the board engaging edges 18, 18 are formed by the junction of two beveled surfaces 19 and 20, respectively, which meet at approximately a 90° angle. The inner beveled surface 20 terminates at a shoulder 21 with the shoulders 21, 21 of the pair of edges terminating in a predetermined spaced apart relation. The outer beveled surface 19 extends upwardly beyond the plane of the shoulder 21. If desired, instead of a creasing rule, a creasing wheel (not shown) may be used having the same cross-sectional configuration as the creasing rule shown in FIG. 5.

For the formation of a 180° fold in the form of the invention illustrated in FIGS. 4 to 9, it is important that the distance between the edges 18, 18 of the creasing rule be a predetermined distance apart. This distance will depend primarily on the thickness T of the paperboard and to a lesser extent on the type of paperboard being used. The distance between the edges 18, 18 will also depend upon the direction of the grain of the paperboard. The spacing between the edges is much more critical in creases running parallel to the grain than in creases running perpendicular to the grain.

The dimensions as shown in FIG. 5 of the drawings in terms of T, the thickness of the paperboard, are the preferred dimensions of the various portions of the creasing rule. Theoretically, the spacing between the edges 18, 18 of the creasing rule should be 3T to provide room for the crease bundle to lie between confronting rear faces of adjacent panels when the board is folded 180°. When the fold is with the grain, this distance may be as small as 2.5T. When the fold line is with the grain on a good quality paperboard, this distance may approach as low as 2T and still make it possible to obtain an adequate but not a good fold because of the extremely high tensile stress which would occur in the front liner of the board. When the fold line is perpendicular to the grain, this distance may be as high as 4T with 3½T being the preferable distance. Accordingly, the limits of this dimension are approximately 2½T to approximately 4T with 3T being preferred for folds with the grain and 3½T preferred for folds across the grain.

The depth of penetration of the edges 18, 18 into the board should be approximately ½T. The shoulders 21, 21 will limit the depth of penetration and accordingly, are in a plane spaced a distance of approximately ½T from the edges 18, 18. There preferably should be a gap between the edges of the shoulder which gap preferably should be a distance approximately equal to T. With this construction, when the crease rule is pressed into the rear face of the paperboard, for example, as shown in FIG. 6, the shoulders 21 will limit the depth of penetration of the creasing rule and at the same time will emboss that portion of the board between the shoulders to cause the portion of the board midway between the two score lines to form the desired shape crease bundle.

It will be noted that with the beveled edges 19 and 20 at a 90° angle these edges will start crushing the board and encourage delamination of the board adjacent the score lines permitting the board to be folded more easily. These parallel score lines in the rear face of the paperboard further disturb and weaken the fiber bond between adjacent layers of fibers lying generally parallel to the rear face of the board in the area of the score lines with the result that when the paperboard is folded along the fold line the rear face of the paperboard will fail in compression and become at least partially delaminated in the area adjacent the rear face and between the score lines to form the desired crease bundle. To prevent embossing of the rear face of the board along the outer edge of the score lines, the faces 19, 19 of the creasing rule should be extended a distance at least equal to ¼T above the plane of the shoulders 21, 21.

During folding of the paperboard along fold lines formed in accordance with the present invention, the weakened rear face of the board will fail in the area between the parallel score lines formed by the creasing rule in compression and will buckle outwardly away from the front face of the board. This will leave a smooth, neat fold at the front face of the board, with a minimum of distortion of the fibers at the front face of the board, thereby permitting the use of paperboard which heretofore has not been considered suitable for paperboard cartons and the like.

Figure 8:
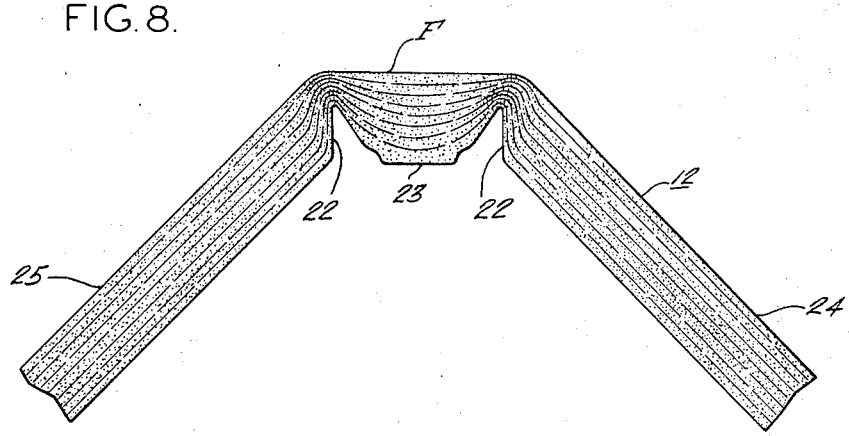
FIG. 8 is a view similar to FIG. 7 showing the displacement of the paperboard during the folding operation.
Figure 9:
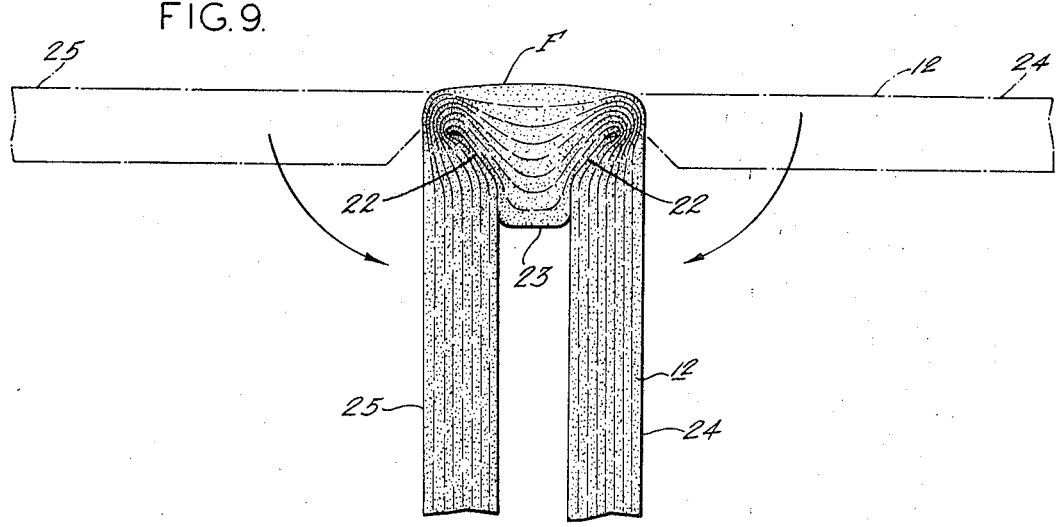
FIG. 9 is a view similar to FIG. 7 with the paperboard in a fully folded position.

FIGS. 7 to 9, inclusive, of the drawings illustrate the deformation of the board during the initial folding operation. As shown in FIG. 7, the rear face of the board has the pair of parallel recessed score lines 22, 22 at opposite sides of the desired fold line and a central slightly embossed area 23 midway between the recessed score lines. Upon initial folding of the board, the board becomes delaminated adjacent to and between the recessed score lines 22, 22 and adjacent the rear face of the board as shown in FIG. 8, and a crease bundle of paperboard starts to form. When the board is folded 180°, for example, to the position as shown in FIG. 9 the board is substantially completely delaminated between the score lines and a generally rectangular crease bundle is formed disposed between the rear faces of the adjacent panels of the board at the fold. With this method of preparing the paperboard for folding, there is a minimum amount of tension on the front liner of the paperboard and a minimum amount of compression of the back liner of the paperboard. Considerable rearrangement of the material within and adjacent to the fold is necessary but no stretching or compressing of any laminar section is necessary to provide this rearrangement of material.

FIG. 4 illustrates a fragmentary portion of a blank for a paperboard carton formed in accordance with the present invention having a base 24 and a pair of side panels 25, 25. The center of the desired fold lines between the base and the side panels is indicated by the broken lines 26, 26. To permit the fold to be made along these lines 26, 26, the rear face of the paperboard is scored along lines 27 as indicated in FIG. 6 which are parallel to one another and equally spaced apart at opposite sides of line 26.

Figure 10:
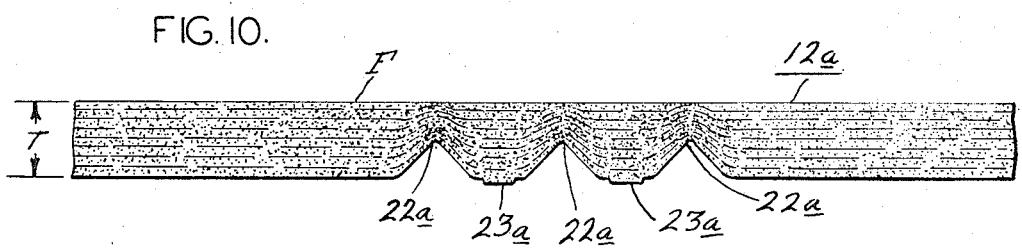
FIG. 10 is a fragmentary sectional view of a section of paperboard incorporating a modified fold line and showing the fold line prior to folding the paperboard.
Figure 11:
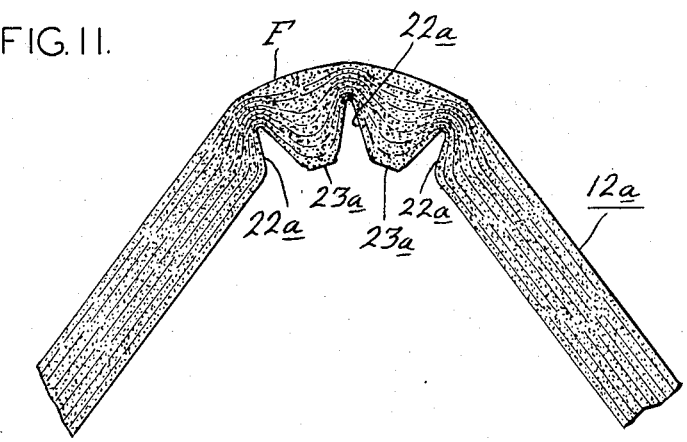
FIG. 11 is a view similar to FIG. 10 of the modified form of foldline showing the displacement of the paperboard during the folding operation.
Figure 12:
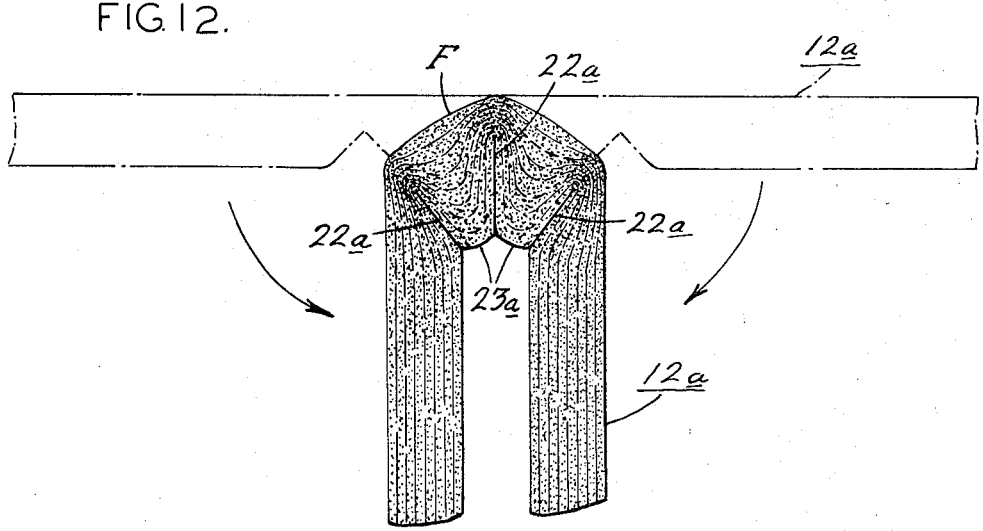
FIG. 12 is a view similar to FIG. 10 of the modified form of fold line with the paperboard in a fully folded position.

The invention as described above is directed to providing a fold line on paperboard with the use of two score lines where it is desired to permit adjacent panels of the paperboard to be folded 180°. It will be apparent that where only a 90° fold is desired, the score lines may be placed closer together than the limits as set forth previously with the result that a smaller crease bundle will be formed. It is also apparent that a 180° fold may be provided by having two 90° folds adjacent one another. FIGS. 10, 11 and 12 of the drawings illustrate a modified form of the invention in which more than two score lines, in this instance three, are provided to permit a 180° fold using, in effect, two adjacent 90° folds.

Referring to FIGS. 10, 11 and 12 of the drawings, there is illustrated therein a sheet of paperboard 12a having a front face F. Three equally spaced parallel score lines 22a are provided in the rear face of the board with the central score line of the three extending along the desired fold line of the paperboard product. The three score lines may be formed by means of apparatus generally similar to the apparatus as disclosed in FIG. 5 with the exception that three creasing edges will be provided instead of two. Central, slightly embossed areas 23a, 23a may be provided midway between adjacent pairs of score lines 22a. The distance between adjacent score lines in this form of the invention must be greater than T, where T is the thickness of the paperboard but less than 2T. The depth of penetration of the score lines into the board should be approximately ½T as in the prior form of the invention shown herein.

Upon initial folding of the paperboard along a fold line formed in accordance with the invention as disclosed in FIGS. 10, 11 and 12, the board becomes delaminated adjacent to and between the recessed score lines 22a and adjacent the rear face of the board as shown in FIG. 11 and two crease bundles of paperboard start to form. When the board is folded 180°; for example, to the position as shown in FIG. 12, the board is substantially completely delaminated between the three score lines 22a and two generally rectangular crease bundles are formed. These crease bundles are disposed between the rear faces of the adjacent panels of the board at the fold and lie in substantially side-by-side relationship. With this method of preparing the paperboard for folding, there is a minimum amount of tension on the front liner of the paperboard and a minimum amount of compression of the back liner of the paperboard. Considerable rearrangement of the material within and adjacent to the fold line is necessary but this is acomplished primarily by the delamination and stratification of the paperboard along lines generally parallel to the rear face of the paperboard in the area adjacent the rear face of the paperboard at the fold line.

From the foregoing it will be observed that the present invention provides novel methods and apparatus for forming fold lines in paperboard and also provides a novel paperboard product having a new type of fold line formed thereon.

We claim:

1. Apparatus for forming fold lines on paperboard comprising; a backing plate having a smooth flat face thereon on which the paperboard is placed with its front face in engagement with the face of the backing plate, creasing members movable toward and away from the backing plate adapted to engage the back of the paperboard on said plate, said creasing members having a pair of spaced parallel creasing edges thereon which engage the paperboard on said backing plate during movement of the creasing means toward the backing plate to form spaced parallel score lines on said paperboard, each of said edges being formed by the juncture of two angularly disposed surfaces and each creasing member having a flat shoulder spaced upwardly from its creasing edge and lying in a plane perpendicular to the direction of movement of the creasing member, shoulders of each creasing member projecting toward one another from the confronting beveled surfaces of the pair of edges and being spaced apart.

2. Apparatus in accordance with claim 1 wherein said flat shoulders are spaced from one another a distance approximately equal to the thickness of the paperboard.

3. Apparatus in accordance with claim 1 wherein the plane of said shoulders is spaced in the direction of movement of said creasing means from said spaced parallel edges a distance equal to approximately ½ the thickness of the paperboard.

4. Apparatus in accordance with claim 1 wherein said spaced parallel edges are sharpened edges which will cut the paperboard.

5. Apparatus in accordance with claim 1 wherein said spaced parallel edges are slightly rounded to form detents in the paperboard.

6. Apparatus in accordance with claim 1 wherein said spaced parallel edges have interrupted sharpened edges thereon to perforate the paperboard.

7. A method of forming a fold line on paperboard to define adjacent panels comprising the step of supporting the front face of the paperboard to avoid distortions thereof, and simultaneously scoring the back face of the paperboard along parallel score lines in which the ratio of the distance between the score lines to the thickness of the paperboard is in the range of approximately 2:1 to 4:1 and wherein the score lines extend into the paperboard to a depth approximately ½ the thickness of the paperboard to form a delaminated crease bundle between the score lines.

8. The method according to claim 7 including the step of embossing the portion of the back face midway between said score lines and adjacent opposite sides of the center of the fold line.

9. A method according to claim 7 including the step of cutting the back face of the paperboard along at least part of said parallel score lines.

10. A paperboard product formed of a single flat substantially homogeneous sheet of fibrous paperboard of uniform thickness having parallel front and rear faces, said paperboard capable of being delaminated into layers of fibers bonded together with said layers extending generally parallel to the front and rear faces thereof; said paperboard product comprising at least two integral panels joined along a fold line, said fold line comprising at least a pair of score lines on the rear face of the paperboard between said two panels, the score lines extending the full length of the fold line and being spaced apart equidistant at opposite sides of the center of the desired fold line, the ratio of the distance between said score lines to the thickness of the paperboard for a 180° fold being in the range of approximately 2:1 to 4:1 and said score lines extending into the rear face of the paperboard for a distance of approximately ½ the thickness of the paperboard, the surface at the front face of the paperboard at said desired fold line prior to folding of the paperboard being undistorted and lying in a plane common with the plane of the surfaces of the front faces of the paperboard immediately adjacent opposite sides of the fold line, said paperboard between said pair of score lines having the bond between layers of fibers weakened by the formation therein of said score lines along planes substantially parallel to the rear face of said paperboard in an area between the score lines extending from the rear face of the paperboard toward the front face and terminating short thereof and said paperboard being at least partially stratified in said area, whereby upon folding of said panels, inwardly along said fold line in a direction wherein the rear faces of the panels move toward one another the rear face fails in compression between the two score lines upon initial folding and buckles in the direction of the fold and away from the front face with the paperboard at least partially delaminating in said area between the score lines into fiber layers substantially parallel to the rear face of the paperboard forming a crease bundle in the rear face between said score lines and said sheet of paperboard at the crease bundle after folding being of greater tickness than its original thickness.

11. A paperboard product formed of a single flat substantially homogeneous sheet of fibrous paperboard of uniform thickness having parallel front and rear faces, said paperboard capable of being delaminated into layers of fibers bonded together with said layers extending generally parallel to the front and rear faces thereof; said paperboard product comprising at least two integral panels joined along a fold line, said fold line comprising at least a pair of score lines on the rear face of the paperboard between said two panels, the score lines extending the full length of the fold line and being spaced apart equidistant at opposite sides of the center of the desired fold line, the distance between said score lines for a 90° fold being greater than the thickness of the paperboard and less than approximately twice the thickness of the paperboard and the score lines extending into the rear face of the paperboard for a distance of approximately ½ the thickness of the paperboard, the surface at the front face of the paperboard at said desired fold line prior to folding of the paperboard being undistorted and lying in a plane common with the plane of the surfaces of the front faces of the paperboard immediately adjacent opposite sides of the fold line, said paperboard between said pair of score lines having the bond between layers of fibers weakened by the formation therein of said score lines along planes substantially parallel to the rear face of said paperboard in an area between the score lines extending from the rear face of the paperboard toward the front face and terminating short thereof and said paperboard being at least partially stratified in said area, whereby upon folding of said panels inwardly along said fold line in a direction wherein the rear faces of the panels move toward one another the rear face fails in compression between the two score lines upon initial folding and buckles in the direction of the fold and away from the front face with the paperboard at least partially delaminating in said area between the score lines into fiber layers substantially parallel to the rear face of the paperboard forming a crease bundle in the rear face between said score lines and said sheet of paperboard at the crease bundle after folding being of greater thickness than its original thickness.

References Cited
UNITED STATES PATENTS 2,598,649    5/1952    Rintoul    93—58.2
3,039,372    6/1962    La Bombard    93—58.3

ROBERT F. BURNETT, Primary Examiner

R. H. CRISS, Assistant Examiner

U.S. Cl. X.R.

93—58, 58.1, 58.3; 161—102, 124